United States Patent [19]

Hori et al.

[11] Patent Number: 5,516,883

[45] Date of Patent: May 14, 1996

[54] BIODEGRADABLE OPTICALLY ACTIVE COPOLYMER AND PROCESS FOR PRODUCING THE SAME

[75] Inventors: Yoji Hori; Akio Yamaguchi, both of Kanagawa, Japan

[73] Assignee: Takasago International Corporation, Tokyo, Japan

[21] Appl. No.: 164,697

[22] Filed: Dec. 9, 1993

[30] Foreign Application Priority Data

| | | | |
|---|---|---|---|
| Dec. 11, 1992 | [JP] | Japan | 4-353170 |
| Mar. 26, 1993 | [JP] | Japan | 5-090548 |
| Nov. 5, 1993 | [JP] | Japan | 5-301248 |

[51] Int. Cl.$^6$ .................................................. C08G 63/08
[52] U.S. Cl. ........................ 528/354; 528/357; 528/361; 556/83
[58] Field of Search ............................. 528/354, 357, 528/361; 556/83

[56] References Cited

U.S. PATENT DOCUMENTS

| | | | |
|---|---|---|---|
| 4,320,753 | 3/1982 | Lenz et al. | 528/361 X |
| 4,876,331 | 10/1989 | Doi | 528/361 |
| 4,981,696 | 1/1991 | Loomis et al. | 424/486 |
| 5,023,316 | 6/1991 | Benvenuti et al. | 528/357 |
| 5,191,016 | 3/1993 | Yalpani | 525/54.2 |
| 5,191,037 | 3/1993 | Doi et al. | 525/450 |
| 5,221,755 | 6/1993 | Yamaguchi et al. | 549/267 |

FOREIGN PATENT DOCUMENTS

| | | |
|---|---|---|
| 0509203 | 10/1992 | European Pat. Off. . |
| 0522422 | 1/1993 | European Pat. Off. . |

OTHER PUBLICATIONS

European Search Report Reference No. T07-79983C/KO; EP 93309999.6.
Billingham et al., Journal of Organometallic Chemistry, "Polymerization and copolymerization of B-butyrolactone by aluminum compounds", vol. 341, No. 1-3, pp. 83-93, Mar. 1988.

Zhang et al., Macromolecules, "Stereo Chemistry of the Ring Opening Polymerization of (S)-B-Butyrolactone", vol. 23, No. 13, pp. 3206-3212, Jun. 1990.

Primary Examiner—Melvyn I. Marquis
Assistant Examiner—Shelley A. Dodson
Attorney, Agent, or Firm—Sughrue, Mion, Zinn, Macpeak & Seas

[57] ABSTRACT

A biodegradable, optically active copolymer is disclosed. The copolymer is represented by general formula (I):

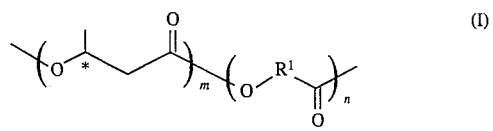

wherein $R^1$ represents a group selected from the group consisting of methyldimethylene, 1,2-dimethyldimethylene, 1,1-dimethyldimethylene, methyltrimethylene, tetramethylene, methyltetramethylene, pentamethylene, 1,4-dimethyl-2-oxo-3-oxytetramethylene, 2-oxo-3-oxytetramethylene, and 2-methyl-3-oxypentamethylene, and m and n each represents a natural number of from 10 to 15,000. According to the present invention, useful polymers which are a new type of functional materials characterized as having optical activity, biodegradability (enzymatic degradability), and hydrolyzability can be easily produced in an industrially advantageous manner by the ring-opening copolymerization of optically active β-butyrolactone with various lactones.

5 Claims, No Drawings

BIODEGRADABLE OPTICALLY ACTIVE COPOLYMER AND PROCESS FOR PRODUCING THE SAME

FIELD OF THE INVENTION

The present invention relates to a novel biodegradable, optically active copolymer and a process for producing the same. More particularly, this invention relates to a novel optically active polyester obtained by the ring-opening copolymerization of optically active (R)-β-butyrolactone with any of various lactones, and to a process for producing the copolymer.

The copolymer of the present invention is a thermoplastic resin having optical activity, biodegradability, and hydrolyzability, and is hence a functional polymer that can be extensively utilized as a clean plastic not causing environmental pollution because it is degraded by microorganisms present in soils or waters.

The copolymer of the present invention is also utilizable as medical materials, especially as sutures for use in surgical operations.

BACKGROUND OF THE INVENTION

Known in recent years is a microorganism which accumulates a polymer of (R)-3-hydroxybutyric acid (hereinafter abbreviated as (R)-3-HB) within the cells thereof; that polymer corresponds to one of the moieties constituting the compound of the present invention. It is also known that there are a large number of microorganisms which accumulate within the cells thereof various kinds of (R)-3-hydroxyalkanoic acid units (hereinafter abbreviated as (R)-3-HA). (See P. A. Holmes, *Phys. Technol.*, 1985, (16), p.32 and *Seibunkaisei Kobunshi Zairyo (Biodegradable Polymeric Materials).*, p.26, written by Yoshiharu Doi, published by Kogyo Chosa Kai, 1990.)

Further, a polymer having (R)-3-HB and a 4-hydroxybutyric acid unit (hereinafter abbreviated as 4-HB) had not been produced until it was synthesized by means of a microorganism (see *polym. Commum.*, 29, 174 (1988)). Since these polymers have such properties as biodegradability or enzymatic degradability, hydrolyzability, and compatibility to the living body, they are attracting attention as a new type of functional materials (see *Seibunkaisei Kobunshi Zairyo*, p.19, written by Yoshiharu Doi, published by Kogyo Chosa Kai, 1990 and JP-A-4-292619). (The term "JP-A" as used herein means an unexamined published Japanese patent application".)

These microbial methods for polymer synthesis are disadvantageous in that since the methods utilize a microorganism or an enzymatic reaction, a troublesome step is needed, for example, to separate the polymer from the cells, and that the cost of production is high.

In addition, most of the polymers thus produced contain an (R)-3-HA unit and a 4-HB unit, and only one polymer has been reported which contains a 5-hydroxyvaleric acid unit (*Makromol. Chem., Rapid Commun.*, 8, 631 (1987)).

On the other hand, the ring-opening polymerization of optically active β-butyrolactone has been reported in *Polymer Letters.*, 9, 173 (1970), Macromolecules, 23, 3206 (1990), and *Macromolecules*, 24, 5732 (1991). However, ring-opening copolymerization of the lactone with other lactone has been unknown so far.

With respect to the ring-opening copolymerization of racemic β-butyrolactone with δ-valerolactone or ε-caprolactone, there is a report in *J. Organomet. Chem.*, 341, p.83 (1988).

A low-molecular-weight polymer obtained by the condensation polymerization of racemic 3-HB with lactic acid has been reported in U.S. Pat. No. 3,579,549.

However, the production of a biodegradable polymer by the ring-opening polymerization of (R)-β-butyrolactone has many problems from an industrial standpoint. Specifically, there are no simple methods for synthesizing optically active (R)-β-butyrolactone, i.e., the monomer. Further, as compared with microbial polymerization methods, the ring-opening polymerization method is defective in that molecular weight is low and catalytic activity is also low, resulting in high production cost.

SUMMARY OF THE INVENTION

Accordingly, an object of the present invention is to provide a novel, biodegradable, optically active polymer which is a high-molecular-weight polymer containing an (R)-3-HB unit and having excellent biodegradability and hydrolyzability, and to provide an industrially advantageous process for producing the polymer.

The present inventors made intensive studies in order to overcome the above-described problems. As a result, it has been found that optically active β-butyrolactone readily undergoes ring-opening copolymerization with various kinds of lactones in the presence of a high-activity catalyst to give corresponding, optically active polyesters having high molecular weights. The present invention has been completed based on this finding.

The present invention provides a biodegradable, optically active copolymer represented by general formula (I):

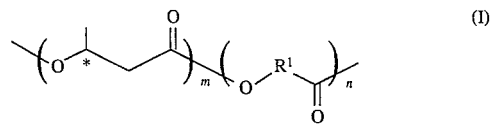

wherein R¹ represents a group selected from the group consisting of methyldimethylene, 1,2-dimethyldimethylene, 1,1-dimethyldimethylene, methyltrimethylene, tetramethylene, methyltetramethylene, pentamethylene, —CH(CH₃)—O—C(=O)—CH(CH₃)— [hereinafter referred to as 1,4-dimethyl-2-oxo-3-oxytetramethylene], —CH₂—O—C(=O)—CH₂— [hereinafter referred to as 2-oxo-3-oxytetramethylene], and —CH₂—CH(CH₃)—O—CH₂CH₂— [hereinafter referred to as 2-methyl-3-oxypentamethylene], and m and n each represents a natural number of from 10 to 15,000, said copolymer having a weight-average molecular weight of from 8,000 to 1,000,000.

In another aspect of the present invention, a biodegradable, optically active copolymer is provided which comprises structural units represented by general formula (III):

and structural units represented by general formula (IV):

wherein R¹ represents a group selected from the group consisting of methyldimethylene, 1,2-dimethyldimethylene, 1,1-dimethyldimethylene, methyltrimethylene, tetramethylene, methyltetramethylene, pentamethylene, 1,4-dimethyl-2-oxo-3-oxytetramethylene, 2-oxo-3-oxytetramethylene, and 2-methyl-3-oxypentamethylene, and m and n each represents a natural number of from 10 to 15,000 with the ratio of the structural units (III) to the structural units (IV) being in the range of from 99:1 to 1:99, and which has a weight-average molecular weight of from 8,000 to 1,000,000.

The present invention further provides a process for producing the biodegradable, optically active copolymer, which comprises subjecting optically active β-butyrolactone and a four-, five-, six- or seven-membered lactone to ring-opening copolymerization in the presence of a catalyst.

The catalyst preferably is selected from the group consisting of a tin compound catalyst, an aluminum compound catalyst, a zinc compound catalyst, and a distannoxane catalyst.

It is more preferred that the catalyst be a distannoxane catalyst represented by general formula (V):

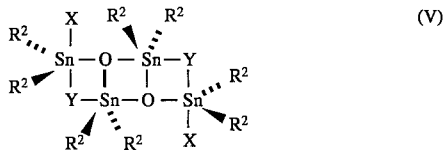

wherein R² represents either an alkyl group having from 1 to 4 carbon atoms or phenyl group, X is selected from the group consisting of Cl, Br, and NCS, and Y is selected from the group consisting of Cl, Br, NCS, OH, an alkoxy group having from 1 to 4 carbon atoms, and phenoxy group.

DETAILED DESCRIPTION OF THE INVENTION

The optically active β-butyrolactone to be used as one of the raw materials for the copolymer of the present invention can be easily obtained by the method disclosed in Japanese Patent Application No. 4-210683. In this method, diketene of the formula:

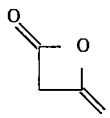

is subjected to asymmetric hydrogenation using a ruthenium-optically active phosphine complex as catalyst. The ruthenium-optically active phosphine complex can be obtained by the processes as disclosed, for example, in JP-A-61-63690, JP-A-64-68386, JP-A-63-135397, JP-A-63-41487, JP-A-63-145292, JP-A-2-191289, JP-A-62-265293, T. Ikariya et al., *J. Chem. Soc., Chem. Commun.*, pp. 922–924 (1985), and J. P. Genet et al., *Tetrahedron: Asymmetry*, Vol. 2, No. 7, pp. 555–567 (1991).

Examples of the four-, five-, six- or seven-membered lactone to be used as the other raw material for the copolymer of the present invention include α-methyl-β-propiolactone, α,β-dimethyl-β-propiolactone, α,α-dimethyl-β-propiolactone, γ-butyrol-butyrolactone, α-methyl-γ-butyrolactone, glycolide, L-lactide, DL-lactide, δ-valerolactone, β-methyl-δ-valerolactone, ε-caprolactone, and optically active 7-methyl-1,4-dioxepan-5-one.

In the present invention, at least one of such four-, five, six -or seven-membered lactones is used; if required, two or more thereof may be used in combination.

As these lactone, one prepared by purifying a commercially available product may be used. For example, a lactone product on the market is purified by subjecting it twice to a purification operation comprising addition of calcium hydride, followed by distillation, and the purified lactone is stored in an inert gas until use.

The proportion of the optically active β-butyrolactone to the other lactone to be subjected to ring-opening copolymerization in the present invention is such that the ratio of the former to the latter is in the range of from 99:1 to 1:99 by mol%. Higher proportions of the optically active β-butyrolactone are preferred in that the higher the proportion of the optically active β-butyrolactone to the other lactone, the more the polymer to be produced is biodegradable.

The ring-opening copolymerization may be carried out by a method in which optically active β-butyrolactone and the other lactone in a suitable proportion within the above-specified range are introduced into a reaction vessel in an inert gas, such as nitrogen or argon, subsequently the catalyst that will be described below is added thereto, and the monomers are then allowed to react at a temperature of from 60 to 100° C. under ordinary pressure for from 1 hour to 3 days, thereby to obtain a random copolymer.

The catalyst to be used in the polymerization reaction may be a tin compound catalyst, aluminum compound catalyst, zinc compound catalyst, distannoxane catalyst, or the like. Examples of the tin compound catalyst include dibutyltin oxide, tin dioctylate, and dibutyltin dilaurate. Examples of the aluminum compound catalyst include triethylaluminum-water, methylalumoxane, ethylalumoxane, aluminum trimethoxide, aluminum triethoxide, aluminum triisopropoxide, and aluminum triphenoxide. Examples of the zinc compound catalyst include diethylzinc-water, diethylzinc-ethylene glycol, diethylzinc-methanol, and diethylzinc-ethanol.

Examples of the distannoxane catalyst of formula (II) given hereinabove include 1,3-dichlorotetrabutyldistannoxane, 1,3-dichlorotetraphenyldistannoxane, 1,3-dibromotetrabutyldistannoxane, 1-hydroxy-3-chlorotetrabutyldistannoxane, 1-hydroxy-3-bromotetrabutyldistannoxane, 1-hydroxy-3-(isothiocyanato)tetrabutyldistannoxane, 1-ethoxy- 3-chlorotetrabutyldistannoxane, 1-phenoxy-3-chlorotetrabutyldistannoxane, 1-phenoxy-3-bromotetrabutyl-distannoxane, 1-methoxy- 3-(isothiocyanato)tetrabutyldistannoxane,1-phenoxy-3-(isothiocyanato)tetrabutyldistannoxane, 1,3-bis(isothiocyanato)tetrabutyldistannoxane, and 1,3-bis(isothiocyanato)tetramethyldistannoxane.

At least one of such catalysts is used; if required, two or more thereof may be used in combination.

The amount of the catalyst to be added may be from 1/100 to 1/40,000 mole per mole, preferably from 1/1,000 to 1/20,000 mole per mole, more preferably from 1/1,000 to 1/5,000 mole per mole, of that of the β-butyrolactone as one of the raw-material monomers.

Of the catalysts enumerated above, 1,3-dichlorotetrabutyldistannoxane, for example, can be easily synthesized by the method described in *J. Organomet. Chem.*, 3, p.70, (1965). Further, 1-hydroxy-3-(isothiocyanato)tetrabutyldistannoxane can be easily synthesized by reacting dibutyltin oxide with dibutyltin isothiocyanate in ethanol as described in *J. Org. Chem.*, 56, p.5307, (1991).

The present invention will be explained below in more detail with reference to the following Examples, Test Examples, and others, but the invention is not construed as being limited thereto.

In the Examples, Test Examples, and others given below, the following analytical instruments and biodegradability testing devices were used.

1) Nuclear magnetic resonance spectrum (NMR): Type AM-400 (400 MHz) (manufactured by Bruker, Inc.)
2) Molecular weight: D-2520 GPC Integrator (manufactured by Hitachi Ltd., Japan)
3) Optical rotation: Digital Polarimeter, Type DIP-360 (manufactured by JASCO Inc., Japan)
4) Differential scanning calorimeter (DSC): DSC 50 (manufactured by Shimadzu Corp., Japan)
5) Thermogravimetric analyzer (TGA): TGA 50 (manufactured by Shimadzu Corp.)
6) Biodegradability test: Using an activated sludge (purchased from Chemicals Inspection & Testing Institute, Japan on Oct. 22, 1992), biodegradability was examined in accordance with "Test of Degradation of Chemical Substances by Microorganisms etc."as provided for in "Test Methods for Novel Chemical Substances" (Kanpogyo: Bureau certified No. 5, Yakuho: Bureau certified No. 615, 49 Kikyoku: Bureau certified No. 392, Jul. 13, 1974) and with the related description in Y. Doi, A. Segawa, and M. Kunioka, Int. *J. Biol. Macromol.*, 1990, Vol.12, April, 106.

Data for the copolymers synthesized in the following Examples and Comparative Example are summarized in Table 1, which data include those on monomer unit proportion in each copolymer, weight-average molecular weight ($M_w$), number-average molecular weight ($M_n$), glass transition point ($T_g$), melting point ($T_m$), decomposition temperature, and specific rotation.

EXAMPLE 1

Synthesis of polyester from (R)-β-butyrolactone (hereinafter abbreviated as (R)βBL) and ε-caprolactone (hereinafter abbreviated as εCL) by ring-opening copolymerization Synthesis of (R)-βBL 17.1 Milligrams (0.01mmol) of $Ru_2Cl_4((-)$-Tol-BINAP$)_2NEt_3$ [wherein Tol-BINAP represents 2,2'-bis{di(p-tolyl)phosphino}1,1'-binaphthyl]was precisely weighed out and placed in a 100 -ml stainless-steel autoclave in a nitrogen atmosphere, and 10 ml of tetrahydrofuran was added thereto to dissolve it. To this solution was added 2.42 mg (0.02mmol) of dimethylaniline. This mixture was stirred at 50° C. for 20 minutes. Subsequently, 1.7 g (20 mmol) of diketene was introduced into the autoclave and the resulting mixture was stirred at a reaction temperature of 60° C. for 60 hours at a hydrogen pressure of 100 Kg/cm². The reaction mixture was distilled, thereby obtaining 1.64 g (yield 95%) of a fraction having a boiling point of 71–73° C. at 29 mmHg. The optical purity of this reaction product was determined by subjecting the product to solvolysis in methanol (methanolysis), subsequently converting the solvolysis product to its ester with methoxytrifluoromethylphenylacetic acid, and then subjecting the ester to 1H-NMR analysis. From the thus-obtained diastereomer proportion value, the optical purity was determined to be 91%ee.

Into a 20-ml reaction vessel were introduced 0.78 g (9.0 mmol) of (R)-βBL, 0.11 g (1.0 mmol) of εCL, and 0.0056 g (0.005mmol) of 1-ethoxy-3-chlorotetrabutyldistannoxane. This mixture was stirred at 100° C. for 2 hours in an Argon (hereinafter referred to as Ar) atmosphere. The reaction product was dissolved in chloroform and this solution was poured into a mixed solvent consisting of methanol, diethyl ether, and hexane, thereby to reprecipitate the reaction product. Thus, the title copolymer was obtained in an amount of 0.60 g (yield 67.5%).

$^1$H-NMR (400 MHz, CDCl$_3$) εppm:

(R)-βBL moiety: 1.18–1.32 (3H, m), 2.41–2.53 (1H, m), 2.55–2.68 (1H, m), 5.18–5.32 (1H, m)

εCL moiety: 1.32–1.45 (2H, m), 1.56–1.70 (4H, m), 2.22–2.35 (2H, m), 4.01–4.10 (2H, m)

EXAMPLE 2

Synthesis of polyester from (R)-βBL and εCL by ring-opening copolymerization

Reaction was conducted in the same manner as in Example 1 except that 0.69 g (8.0 mmol) of (R)-βBL, 0.23 g (2.0 mmol) of εCL, and 0.0053 g (0.005 mmol) of 1-hydroxy-3-chlorotetrabutyldistannoxane were used. As a result, the title copolymer was obtained in an amount of 0.70 g (yield 76.3%).

EXAMPLE 3

Synthesis of polyester from (R)-βBL and εCL by ring-opening copolymerization

Reaction was conducted in the same manner as in Example 1 except that 0.69 g (8.0 mmol) of (R)-βBL, 0.23 g (2.0 mmol) of εCL, and 0.0056 g (0.005 mmol) of 1-hydroxy-3-(isothiocyanato)tetrabutyldistannoxane were used. As a result, the title copolymer was obtained in an amount of 0.66 g (yield 71.9%).

EXAMPLE 4

Synthesis of polyester from (R)-βBL and δ-valerolactone (hereinafter abbreviated as δVL) by ring-opening copolymerization Reaction was conducted in the same manner as in Example 1 except that 0.78 g (9.0 mmol) of (R)-βBL and 0.10 g (1.0 mmol) of 8δVL were used. As a result, the title copolymer was obtained in an amount of 0.77 g (yield 88.0%).

$^1$H-NMR (400 MHz, CDL$_3$) δppm:

(R) βBL moiety: 1.20–1.32 (3H, m), 2.40–2.52 (1H, m), 2.53–2.68 (1H, m), 5.18–5.32 (1H, m)

δVL moiety: 1.62–1.71 (2H, m), 2.26–2.34 (4H, m), 4.03–4.12 (2H, m)

EXAMPLE 5

Synthesis of polyester from (R)-βBL and β-methyl-δ-valerolactone (hereinafter abbreviated as β-Me-δVL) by ring-opening copolymerization Reaction was conducted in the same manner as in Example 1 except that 0.78 g (9.0 mmol) of (R)-βBL and 0.11 g (1.0 mmol) of β-Me-δVL were used. As a result, the title copolymer was obtained in an amount of 0.65 g (yield 73.1%).

$^1$H-NMR (400 MHz, CDCl$_3$) δppm:

(R)-β-BL moiety: 1.20–1.32 (3H, m), 2.40–2.53 (1H, m), 2.54–2.68 (1H, m), 5.18–5.32 (1H, m)

β-Me-δVL moiety: 0.97 (3H, d, J=6.5 Hz), 1.45–1.58 (1H, m), 1.62–1.75 (1H, m), 2.00–2.18 (2H, m), 2.25–2.35 (1H, m), 4.06–4.17 (2H, m)

EXAMPLE 6

Synthesis of polyester from (R)-βBL and L-lactide (hereinafter abbreviated as L-LA) by ring-opening copolymerization Reaction was conducted in the same manner as in Example 1 except that 0.78 g (9.0 mmol) of (R)-βBL and 0.14 g (1.0 mmol) of L-LA were used. As a result, the title copolymer was obtained in an amount of 0.66 g (yield 72.1%).

$^1$H-NMR (400 MHz, CDCl$_3$) δppm:

(R)-βBL moiety: 1.20–1.34 (3H, m), 2.42–2.80 (2H, m), 5.20–5.35 (1H, m)
L-LA moiety 1.40–1.60 (3H, m), 5.02–5.20 (2H, m)

EXAMPLE 7

Synthesis of polyester from (R)-βBL and L-LA by ring-opening copolymerization

Reaction was conducted in the same manner as in Example 1 except that 0.60 g (7.0 mmol) of (R)-βBL and 0.43 g (3.0 mmol) of L-LA were used. As a result, the title copolymer was obtained in an amount of 0.68 g (yield 65.8%).

EXAMPLE 8

Synthesis of polyester from (R)-βBL and glycolide (hereinafter abbreviated as GL) by ring-opening copolymerization Reaction was conducted in the same manner as in Example 1 except that 1.38 g (16.0 mmol) of (R)-βBL and 0.46 g (4.0 mmol) of GL were used. The reaction product was dissolved in chloroform and the insoluble matter was filtered out. The resulting filtrate was poured into a mixed solvent consisting of diethyl ether and hexane, thereby to reprecipitate the reaction product. Thus, the title copolymer was obtained in an amount of 0.59 g (yield 32.1%).

$^1$H-NMR ( 400 MHz, CDCl$_3$) δppm:
(R) -βBL moiety: 1.21–1.41 (3H, m), 2.40–2.82 (2H, m), 5.20–5.43 (1H, m)
GL moiety: 4.53–4.62 (2H, m)

EXAMPLE 9

Synthesis of polyester from (R)-βBL and εCL by ring-opening copolymerization

Reaction was conducted in the same manner as in Example 1 except that 0.69 g (8.0 mmol) of (R)-βBL, 0.23 g (2.0 mmol) of εCL, and 0.0050 g (0.02mmol) of dibutyltin oxide were used.

As a result, the title copolymer was obtained in an amount of 0.70 g (yield 76.3%).

EXAMPLE 10

Synthesis of poly(ester ether) from (R)-βBL and (R)-7-methyl1,4-dioxepan-5-one ((R)-MDO) by ring-opening copolymeriza Reaction was conducted in the same manner as in Example 1 except that 2.58 g (30 mmol) of (R)-βBL, 1.30 g (10 mmol) of (R)-MDO, and 0.0056 g (0.005 mmol) of 1-ethoxy-3-chlorotetrabutyldistannoxane were used. As a result, the title copolymer was obtained in an amount of 3.44 g (yield 88.6%).

EXAMPLE 11

Synthesis of poly(ester ether) from (R) -βBL and (R)-MDO by ring-opening copolymerization Reaction was conducted in the same manner as in Example 1 except that 3.18 g (37mmol) of (R)-βBL, 0.60 g (4.6 mmol) of (R)-MDO, and 0.0056 g (0.005 mmol) of 1-ethoxy-3chlorotetrabutyldistannoxane were used. As a result, the title copolymer was obtained in an amount of 3.56 g (yield 94.2%).

COMPARATIVE EXAMPLE 1

Synthesis of polyester from racemic βBL and εCL by ring-opening copolymerization Reaction was conducted in the same manner as in Example 1 except that 6.20 g (72.0 mmol) of racemic βBL, 0.91 g (2.0 mmol) of εCL, and 0.0225 g (0.02 mmol) of 1-ethoxy-3-chlorotetrabutyldistannoxane were used. As a result, the title copolymer was obtained in an amount of 6.50 g (yield 91.4%).

TABLE 1

| Example | Monomer unit proportion | Mw | Mn | Tg (°C.) | Tm (°C.) | Decomposition temperature (°C.) | Specific rotation [α]D25(c = 1) |
|---|---|---|---|---|---|---|---|
| Example 1 | (R)-βBL/εCL 88/12 | 108000 | 66000 | −11 | 106 | 289 | −1.6 |
| Example 2 | (R)-βBL/εCL 74/26 | 115000 | 64000 | −21 | 86 | 291 | −1.7 |
| Example 3 | (R)-βBL/εCL 72/28 | 91000 | 51000 | −25 | 82 | 295 | −1.8 |
| Example 4 | (R)-βBL/δVL 94/6 | 95000 | 52000 | −2 | 114 | 292 | −1.1 |
| Example 5 | (R)-βBL/β-Me-δVL 91/9 | 106000 | 60000 | −4 | 100 | 290 | −1.1 |
| Example 6 | (R)-βBL/L-LA 84/16 | 80000 | 43000 | 12 | 105 | 290 | −34.3 |
| Example 7 | (R)-βBL/L-LA 44/56 | 98000 | 45000 | 37 | 86 | 297 | −104.7 |
| Example 8 | (R)-βBL/GL 89/11 | 144000 | 77000 | 8 | — | 271 | 0.6 |
| Example 9 | (R)-βBL/εCL 71/29 | 124000 | 67000 | −25 | 82 | 290 | −1.8 |
| Example 10 | (R)-βBL/(R)-MDO 75/25 | 296000 | 157000 | −11 | 90 | 278 | −1.5 |
| Example 11 | (R)-βBL/(R)-MDO 89/11 | 356000 | 203000 | −4 | 129 | 279 | −1.9 |
| Comparative Example 1 | racemic βBL/εCL 89/11 | 76000 | 48000 | −11 | 49 | 290 | |

EXAMPLE 12

Synthesis of polyester from (R)-βBL and α-methyl-β-propiolactone (hereinafter abbreviated as α-Me-βPL) by ring-opening copolymerization Reaction was conducted in the same manner as in Example 1 except that 3.27 g (38.0 mmol) of (R)-βBL, 0.17 g (2.0 mmol) of α-Me-βPL and 0.0225 g (0.02 mmol) of 1-ethoxy-3-chlorotetrabutyldistannoxane were used. As a result, the title copolymer was obtained in an amount of 2.93 g (yield 85.2%).

$^1$H-NMR (400 MHz, CDCl$_3$) δppm:
(R)-βBL moiety: 1.21–1.34 (3H, m), 2.42–2.52 (1H, m), 2.55–2.67 (1H, m), 5.19–5.31 (1H, m)
α-Me-βPL moiety: 1.18 (3H, d, J=6.3 Hz), 2.69–2.80 (1H, m), 4.10–4.27 (2H, m)

EXAMPLE 13

Synthesis of polyester from (R)-βBL and α,β-dimethyl-β-propiolactone (hereinafter abbreviated as α,β-DMe-βPL) by ring-openig copolymerization Reaction was conducted in the same manner as in Example 1 except that 3.27 g (38.0 mmol) of (R)-βBL, 0.20 g (2.0 mmol) of α,β-DMe-βPL and 0.0225 g (0.02 mmol) of 1-ethoxy-3-chlorotetrabutyldistannoxane were used. As a result, the title copolymer was obtained in an amount of 3.11 g (yield 89.6%).

$^1$H-NMR (400 MHz, CDL$_3$) δppm:
(R)-βBL moiety: 1.23–1.33 (3H, m), 2.40–2.52 (1H, m), 2.55–2.67 (1H, m), 5.18–5.31 (1H, m)
α,α-DMe-βPL moiety: 1.10–1.16 (3H, m), 1.16–1.23 (3H, m), 2.55–2.67 (1H, m), 5.06–5.17 (1H, m)

EXAMPLE 14

Synthesis of polyester from (R)-βBL and α,β-DMe-βPL by ring-opening copolymerization Reaction was conducted in the same manner as in Example 1 except that 3.10 g (36.0 mmol) of (R)-βBL, 0.40 g (4.0 mmol) of α,β-DMe-βPL and 0.0225 g (0.02 mmol) of 1-ethoxy-3-chlorotetrabutyldistannoxane were used. As a result, the title copolymer was obtained in an amount of 2.82 g (yield 80.6%).

EXAMPLE 15

Synthesis of polyester from(R)-βBL and α,β-DMe-βPL by ring-opening copolymerization Reaction was conducted in the same manner as in Example 1 except that 2.75 g (32.0 mmol) of (R)-βBL, 0.80 g (8.0 mmol) of α,β-DMe-βPL and 0.0225 g (0.02 mmol) of 1-ethoxy-3-chlorotetrabutyldistannoxane were used. As a result, the title copolymer was obtained in an amount of 2.75 g (yield 78.3%).

EXAMPLE 16

Synthesis of polyester from (R)-βBL and α,α-dimethyl-β-proiolactone (hereinafter abbreviated as α,α-DMe-βPL) by. ring-opening copolymerization Reaction was conducted in the same manner as in Example 1 except that 3.27 g (38.0mmol) of (R)-βBL, 0.20 g (2.0 mmol) of α,α-DMe-βPL and 0.0225 g (0.02 mmol) of 1-ethoxy-3-chlorotetrabutyldistannoxane were used. As a result, the title copolymer was obtained in an amount of 3.27 g (yield 94.2%).

$^1$H-NMR (400 MHz, CDCl$_3$) δppm:
(R)-βBL moiety: 1.21–1.32 (3H, m), 2.41–2.52 (1H, m), 2.56–2.68 (1H, m), 5.20–5.31 (1H, m)
α,α-DMe-βPL moiety: 1.19 (6H, s), 4.30–4.17 (2H, m)

EXAMPLE 17

Synthesis of polyester from (R)-βBL and α,α-DMeβPL by ring-opening coolymerization Reaction was conducted in the same manner as in Example 1 except that 3.10 g (36.0 mmol) of (R)-βBL, 0.40 g (4.0 mmol) of α,α-DMe-βPL and 0.0225 g (0.02 mmol) of 1-ethoxy-3-chlorotetrabutyldistannoxane were used. As a result, the title copolymer was obtained in an amount of 3.14 g (yield 89.7%).

EXAMPLE 18

Synthesis of polyester from (R)-βBL and α,α-DMe-βPL by ring-opening copolymerization Reaction was conducted in the same manner as in Example 1 except that 2.72 g (32.0 mmol) of (R)-βBL, 0.80 g (8.0 mmol) of α,α-DMe-βPL and 0.0225 g (0.02 mmol) of 1-ethoxy-3-chlorotetrabutyldistannoxane were used. As a result, the title copolymer was obtained in an amount of 3.30 g (yield 93.0%).

EXAMPLE 19

Synthesis of polyester from (R)-βBL and γ-BL by ring-opening copolymerization

Into a 20-ml reaction vessel were introduced 3.10 g (36.0 mmol) of (R)-βBL, 0.34 g (4.0 mmol) of γ-BL, and 11.2 mg (0.01 mmol) of 1-ethoxy-3-chlorotetrabutyldistannoxane. This mixture was stirred at 100° C. for 4 hours in an Ar atmosphere. The reaction product was treated in the same manner as in Example 1. Thus, the title copolymer was obtained in an amount of 3.29 g (yield 95.6%).

$^1$H-NMR (400 MHz, CDCl$_3$) δppm:
(R)-βBL moiety: 1.20–1.35 (3H, m), 2.40–2.53 (1H, m), 2.53–2.69 (1H, m), 5.18–5.32 (1H, m)
δ-BL moiety: 1.88–1.99 (2H, m), 2.20–2.42 (2H, m), 4.04–4.18 (2H, m)

EXAMPLE 20

Synthesis of polyester from (R)-βBL and δ-BL by ring-opening copolymerization

Reaction was conducted in the same manner as in Example 19 except that 2.76 g (32.0 mmol) of (R)-βBL and 0.69 g (8.0 mmol) of δ-BL were used. As a result, the title copolymer was obtained in an amount of 3.27 g (yield 94.9%).

EXAMPLE 21

Synthesis of polyester from (R)-βBL and γ-BL by ring-opening copolymerization

Reaction was conducted in the same manner as in Example 19 except that 2.41 g (28.0 mmol) of (R)-βBL and 1.03 g (12.0 mmol) of γ-BL were used. As a result, the title copolymer was obtained in an amount of 2.80 g (yield 81.3%).

EXAMPLE 22

Synthesis of polyester from(R)-βBL and γ-BL by ring-opening copolymerization

Reaction was conducted in the same manner as in Example 19 except that 2.07 g (24.0 mmol) of (R)-βBL and 1.38 g (16.0 mmol) of γ-BL were used. As a result, the title copolymer was obtained in an amount of 2.71 g (yield 78.7%).

EXAMPLE 23

Synthesis of polyester from (R)-βBL and γ-BL by ring-opening copolymerization

Reaction was conducted in the same manner as in Example 19 except that 20 mg (0.02 mmol) of dibutyltin oxide was used. As a result, the title copolymer was obtained in an amount of 2.36 g (yield 68.5%).

atmosphere. The reaction product was treated in the same manner as in Example 1. Thus, the title copolymer was obtained in an amount of 3.36 g (yield 99%).

$^1$H-NMR (400 MHz, CDCl$_3$) δppm:

(R)-βBL moiety: 1.22–1.33 (3H, m), 2.42–2.56 (1H, m), 2.56–2.69 (1H, m), 5.20–5.35 (1H, m) β-PL moiety.: 2.58–2.70 (2H, m), 4.28–4.38 (2H, m)

TABLE 2

| Example | Monomer unit proportion | Mw | Mn | Tg (°C.) | Tm (°C.) | Decomposition temperature (°C.) | Specific rotation [α]D25(c = 1) |
|---|---|---|---|---|---|---|---|
| Example 12 | (R)-βBL/α-Me-β-PL 95/5 | 118000 | 80000 | 3 | 143 | 287 | −1.5 |
| Example 13 | (R)-βBL/(α,β-DMe-β-PL, 95/5 | 112000 | 67000 | 4 | 139 | 287 | −1.7 |
| Example 14 | (R)-βBL/α,β-DMe-β-PL, 92/8 | 111000 | 67000 | 6 | 121 | 289 | −2.2 |
| Example 15 | (R)-βBL/α,β-DMe-β-PL, 83/17 | 103000 | 63000 | 6 | 82 | 283 | −3.0 |
| Example 16 | (R)-βBL/α,α-DMe-β-PL, 96/4 | 122000 | 83000 | −7 | 142 | 286 | −1.6 |
| Example 17 | (R)-βBL/(α,α-DMe-β-PL, 91/9 | 103000 | 63000 | 5 | 124 | 289 | −2.1 |
| Example 18 | (R)-βBL/α,α-DMe-β-PL, 82/18 | 105000 | 63000 | −1 | 83 | 286 | −2.8 |
| Example 19 | (R)-βBL/γ-BL 94/6 | 157000 | 96000 | 0.8 | 134.9 | 257 | −1.7 |
| Example 20 | (R)-βBL/γ-BL 89/11 | 108000 | 64000 | −3.6 | 114.0 | 295 | −1.9 |
| Example 21 | (R)-βBL/γ-BL 84/16 | 120000 | 72000 | −6.0 | 85.6 | 293 | −2.7 |
| Example 22 | (R)-βBL/γ-BL 79/21 | 98000 | 59000 | −9.0 | 69.6 | 292 | −2.2 |
| Example 23 | (R) -βBL/γ-BL 94/6 | 107000 | 55000 | −2.1 | 134.4 | 289 | −1.7 |
| Example 24 | (R)-βBL/(R)-βVL 91/9 | 198000 | 130000 | 1.4 | 124 | 286 | −0.7 |
| Example 25 | (R)-βBL/β-PL 90/10 | 96000 | 54000 | −3.1 | 135 | 286 | −1.1 |

EXAMPLE 24

Synthesis of polyester from (R)-βBL and (R) -β-valerolactone (hereinafter abbreviated as (R)-βVL) by ring-opening copolymerization Into a 20-ml reaction vessel were introduced 1.73 g (20.1 mmol) of (R)-βBL, 0.20 g (2.0 mmol) of (R)-βVL, and 5.6 mg (0.005 mmol) of 1-ethoxy-3-chlorotetrabutyldistannoxane. This mixture was stirred at 100° C. for 4 hours in an Ar atmosphere. The reaction product was treated in the same manner as in Example 1. Thus, the title copolymer was obtained in an amount of 1.83 g (yield 95%).

$^1$H-NMR (400 MHz, CDCl$_3$) δppm:

(R)-βBL moiety: 1.20–1.35 (3H, m), 2.40–2.55 (1H, m), 2.55–2.68 (1H, m), 5.18–5.30 (1H, m)

(R)-βVL moiety: 0.90 (3H, t, J=7.4 Hz), 1.58–1.68 (4H, m), 5.10–5.19 (1H, m)

EXAMPLE 25

Synthesis of polyester from (R)-βBL and β-propiolactone (hereinafter abbreviated as β-PL) by ring-opening copolymerization Into a 20-ml reaction vessel were introduced 3.10 g (36.0 mmol) of (R)-βBL, 0.29 g (4.0 mmol) of β-PL, and 22.4 mg (0.02 mmol) of 1-ethoxy-3-chlorotetrabutyldistannoxane. This mixture was stirred at 90° C. for 3 hours in an Ar

TEST EXAMPLE 1

Biodegradability test for the copolymer of Example 1

An activated sludge (purchased from Chemicals Inspection & Testing Institute, Japan on Oct. 22, 1992) was used in this test under conditions of 500 ppm (600 ml), pH 6.0–7.0, and 30° C. The activated sludge and a thin polymer film which had been formed from the copolymer obtained in Example 1 (by dissolving the copolymer in chloroform, casting the solution into a laboratory dish or the like, and evaporating the solvent) and which had dimensions of 1 cm by 2 cm with a thickness of 0.05–0.1 mm and weighed 26–32 mg were placed in a 50-ml flask, and the test was conducted using a shaking-type thermostatic water bath manufactured by TAITEC, Japan.

After the lapse of each of one week and two weeks, the weight of the copolymer was measured to determine the percentage of residual weight.

The results obtained are given in Table 2. The results show that 100% of the polymer film obtained from the copolymer of Example 1 had been degraded in one week and in two weeks.

TEST EXAMPLE 2

Biodegradability test for the copolymer of Example 3

The copolymer obtained in Example 3 was subjected to a biodegradability test in the same manner as in Test Example 1.

The results obtained are given in Table 2, which show that 100% of the polymer film had been degraded in one week and in two weeks.

TEST EXAMPLE 3

Biodegradability test for the copolymer of Example 4

The copolymer obtained in Example 4 was subjected to a biodegradability test in the same manner as in Test Example 1.

The results obtained are given in Table 2, which show that 100% of the polymer film had been degraded in one week and in two weeks.

TEST EXAMPLE 4

Biodegradability test for the copolymer of Example 5

The copolymer obtained in Example 5 was subjected to a biodegradability test in the same manner as in Test Example 1.

The results obtained are given in Table 2, which show that 100% of the polymer film had been degraded in one week and in two weeks.

TEST EXAMPLE 5

Biodegradability test for the copolymer of Example 6

The copolymer obtained in Example 6 was subjected to a biodegradability test in the same manner as in Test Example 1.

The results obtained are given in Table 2, which show that 57% and 100% of the polymer film had been degraded in one week and in two weeks, respectively.

TEST EXAMPLE 6

Biodegradability test for the copolymer of Example 10

The copolymer obtained in Example 10 was subjected to a biodegradability test in the same manner as in Test Example 1.

The results obtained are given in Table 2, which show that 54% and 100% of the polymer film had been degraded in one week and in two weeks, respectively.

COMPARATIVE TEST EXAMPLE 1

Biodegradability test for the Compolymer of Comparative Example 1

The copolymer obtained in Comparative Example 1 (copolymer of racemic βBL and εCL) was subjected to a biodegradability test in the same manner as in Test Example 1.

The results obtained are given in Table 2, which show that 3% and 4% of the polymer film had been degraded in one week and in two weeks, respectively.

TABLE 2

Percentage of the residual weight of polymer before biodegradability test, after 1 week, and after 2 weeks in Test Examples 1 to 6 and Comparative Test Example 1

| | Percentage of Residual Weight (%) | | |
|---|---|---|---|
| | Before test | After 1 week | After 2 weeks |
| Test Example 1 | 100 | 0 | 0 |
| Test Example 2 | 100 | 0 | 0 |
| Test Example 3 | 100 | 0 | 0 |
| Test Example 4 | 100 | 0 | 0 |
| Test Example 5 | 100 | 43 | 0 |
| Test Example 6 | 100 | 46 | 0 |
| Comparative Test Example 1 | 100 | 97 | 96 |

According to the present invention, useful polymers which are a new type of functional materials characterized as having optical activity, biodegradability (enzymatic degradability), and hydrolyzability can be easily produced in an industrially advantageous manner by the ring-opening copolymerization of optically active β-butyrolactone with various lactones. Further, the copolymer of the present invention is a thermoplastic resin having optical activity, biodegradability, and hydrolyzability, and is hence a functional polymer that can be used for a shampoo bottle, fisherman's net, fishing line, agricultural sheet, and paper coating material as a clean plastic not causing environmental pollution because it is degraded by microorganisms present in soils or waters. Furthermore, the copolymer of the present invention is a functional polymer which can be extensively utilized for surgical suture, wound protective materials, microcapsules for slow-release preparation, etc.

While the invention has been described in detail and with reference to specific embodiments thereof, it will be apparent to one skilled in the art that various changes and modifications can be made therein without departing from the spirit and scope thereof.

What is claimed is:

1. A biodegradable, optically active copolymer represented by general formula (I):

$$\left(O^*\underset{}{\underset{}{\bigwedge}}\underset{\|}{\overset{O}{C}}\right)_m \left(O-R^1-\underset{\|}{\overset{O}{C}}\right)_n \quad (I)$$

wherein $R^1$ represents a group selected from the group consisting of methyldimethylene, 1,2-dimethyldimethylene, 1,1-dimethyldimethylene, methyltrimethylene, tetramethylene, methyltetramethylene, pentamethylene, 1,4-dimethyl-2-oxo-3-oxytetramethylene, 2-oxo-3-oxytetramethylene, and 2-methyl-3-oxypentamethylene, and m and n each represents a natural number of from 10 to 15,000, said copolymer having a weight-average molecular weight of from 8,000 to 1,000,000.

2. A biodegradable, optically active copolymer as claimed in claim 1, wherein the ratio of the structural units (III)

$$\left(O^*\underset{}{\underset{}{\bigwedge}}\underset{\|}{\overset{O}{C}}\right)_m \quad (III)$$

to the structural units (IV)

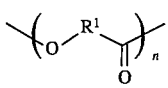

ranges from 99:1 to 1:99.

3. A process for producing the biodegradable, optically active copolymer as claimed in claim 1, which comprises subjecting optically active β-butyrolactone and a four-, five-, six- or seven-membered lactone to ring-opening copolymerization in the presence of a catalyst which is selected from the group consisting of a tin compound catalyst and a distannoxane catalyst.

4. A process as claimed in claim 3, wherein the catalyst is a distannoxane catalyst represented by general formula (V):

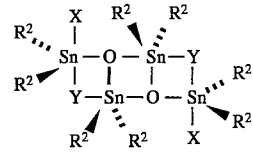

wherein $R^2$ represents either an alkyl group having from 1 to 4 carbon atoms or a phenyl group, X is selected from the group consisting of Cl, Br, and NCS, and Y is selected from the group consisting of Cl, Br, NCS, OH, an alkoxy group having from 1 to 4 carbon atoms, and a phenoxy group.

5. A process as claimed in claim 3, wherein the catalyst is dibutyltin oxide.

* * * * *